Feb. 10, 1970  F. T. IRGENS  3,494,392
CHAIN SAW
Filed Sept. 13, 1965
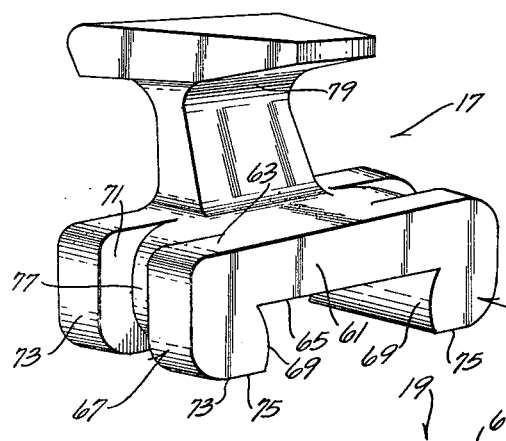
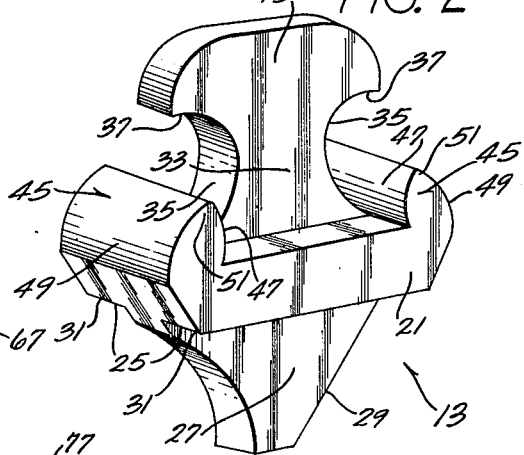
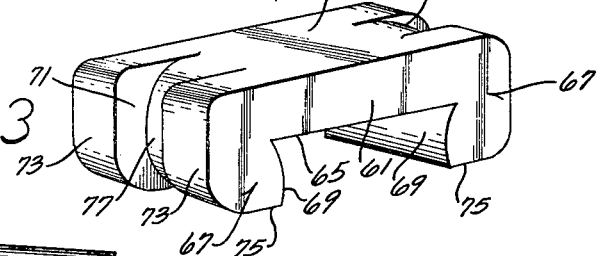
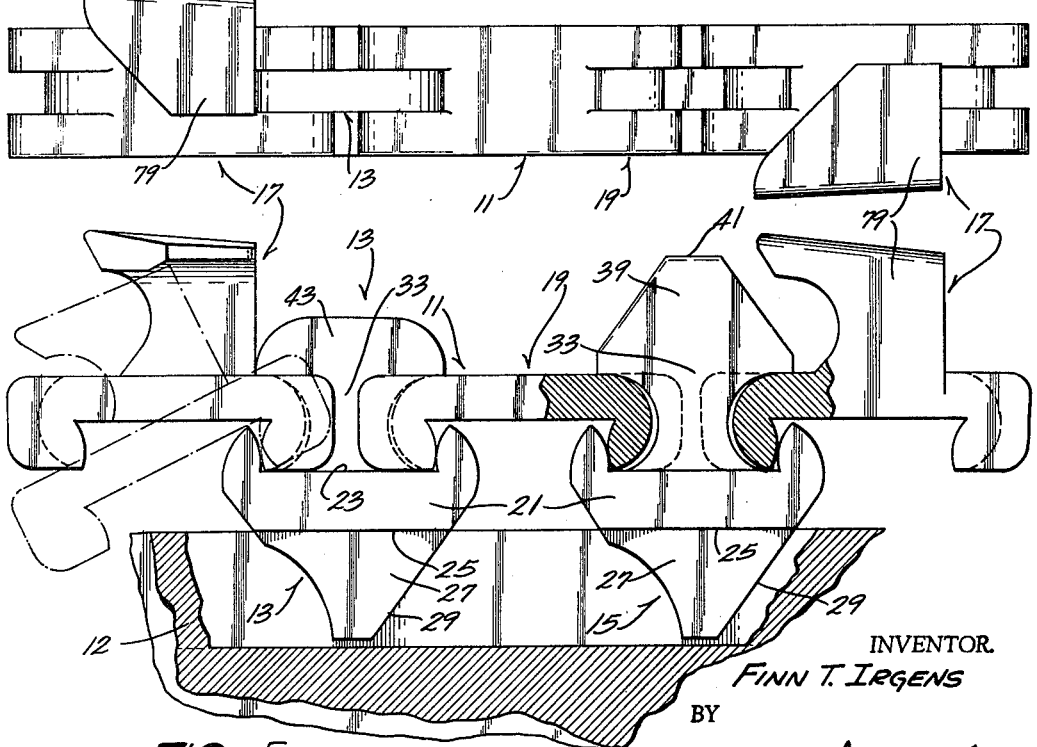
INVENTOR.
FINN T. IRGENS
BY
Wheeler, Wheeler + Wheeler
ATTORNEYS United States Patent Office 3,494,392
Patented Feb. 10, 1970

3,494,392
CHAIN SAW
Finn T. Irgens, Milwaukee, Wis., assignor to Outboard Marine Corporation, Waukegan, Ill., a corporation of Delaware
Filed Sept. 13, 1965, Ser. No. 486,731
Int. Cl. B27b 33/14
U.S. Cl. 143—135
15 Claims

ABSTRACT OF THE DISCLOSURE

Disclosed herein is a rivetless saw chain with links having opposing convexly facing arcuate load transmitting surfaces with locking means to prevent lateral movement and movement normal to the arcuate surface and the direction of movement.

The invention relates generally to saw chains and to saw chain links.

The invention provides a saw chain which can be detachably assembled simply by manipulation of the links and which is without rivet or other such fastening means. The invention also provides a series of links which are adapted to be connected to one another to form a chain by angular manipulation and which afford force transmission lengthwise of the chain by engagement of transverse arcuate surfaces. Preferably, such surfaces are generally formed in the shape of the driving surface of a gear tooth. As a result, force transmission lengthwise through the chain is maintained, despite arcuate travel of the chain, through rolling engagement of adjacent links, thereby substantially reducing wear.

In accordance with the invention, the chain includes two basic link formations which, for purposes of convenience of description, are referred to as upper or outer links and inner or lower links. Use of the adjectives "outer" and "inner" refers to relation of the links to the cutter bar upon which such links travel during use when assembled in a chain. In accordance with the invention, all of the links each include opposing convexly facing arcuate load transmitting surfaces which afford relative angular movement between adjacent links by rolling engagement. All of the links also include locking means to prevent lateral and vertical shifting of the interconnected links while affording releasable or detachable assembly in an endless chain.

Various advantages are provided by the disclosed saw chain. The absence of rivets or other such fasteners affords greater strength because of the avoidance of rivet holes and stresses produced consequent to the riveting. In addition, the absence of rivets permits wide links capable of affording greater strength. Still further, tools are not required for assembly and disassembly of the chain and the various links can be sharpened either when removed from the chain or while retained as a part of an assembled chain. Other objects, advantages, and features of the invention will become apparent by reference to the following description and the accompanying drawings in which:

FIGURE 1 is a perspective view of an outer cutting link in accordance with the invention;

FIGURE 2 is a perspective view of an inner connecting link in accordance with the invention;

FIGURE 3 is a perspective view of an outer connecting link in accordance with the invention;

FIGURE 4 is a top view of a portion of a saw chain embodying various of the features of the invention; and FIGURE 5 is an elevational view, partially broken away in section, of a portion of the chain shown in FIGURE 4.

Shown in FIGURES 4 and 5 is a saw chain 11 which is carried on a fragmentarily shown cutter bar 12 (FIG. 5) and which includes inner or sprocket engaging driver links of two types, namely, connecting driver links 13 and depth gauge driver links 15, together with outer links of three types, namely, right and left hand cutting links 17 and connecting links 19.

All of the inner links include a main body or portion 21 having an upper or top surface 23 and a lower or bottom surface 25. Extending from the longitudinally extending center part of the lower surface 25 of each of the inner links is a sprocket engaging portion or driving stem or tang 27 having a surface 29 adapted to be sprocket driven. The portions 31 of the lower surface 25 to each side of the driving tang 27 constitute bearing surfaces adapted to ride upon a cutter bar. If desired, the driving tang portions of any particular inner link could be omitted.

Each of the inner links also includes a locking tang, a portion, or a stem 33 which extends from the longitudinally extending center part of the upper surface 23 of the main body 21. At their leading and trailing margins or ends, the stems 33 have oppositely facing concavely formed surfaces 35 which facilitate travel of the chain 11 around the nose of a cutter bar and around the drive sprocket. At the top or outer part of each of the concave formations 35, each stem 33 includes forwardly and rearwardly extending lips or surfaces 37 which, when the chain is assembled, partially overlie the top surface of the main portion of the adjacent outer links when the chain is straight and engage the surface 77 of the recess 71 (still to be described) when the chain is curved, to prevent unwanted disassembly.

In the case of the depth gauge inner link 15, the stem 33 includes a depth gauge portion 39 which projects upwardly or outwardly a relatively substantial distance to provide a surface 41 engageable with the bottom of the kerf to limit the amount or extent of penetration of the following cutting link. In the case of the connecting inner link, the stem 33 includes a portion 43 which can be of any shape affording structural strength to the lips 37.

At each end, the inner links each include respective fingers or projections or hook portions 45 which extend upwardly or outwardly from the upper surface 23, which extend continuously across the full width of the ends of the inner links, and which include facing convexly formed surfaces 47. The surfaces 47 engage similar surfaces of adjacent outer links to afford transmission of force therebetween. The surfaces 47 are curved to resemble one flank or driving surface of a gear tooth so as to afford rolling engagement with similar surfaces on the outer links during travel around the curved portions of the saw chain path, thereby decreasing wear. The outer extremities of the inner links are provided with outwardly facing convex surfaces 49 which extend to the upper end of the fingers 45 so that the terminal or outer end part 51 of the fingers is relatively narrow when seen in longitudinal cross section. As shown best in phantom lines at the left of FIGURE 4, this construction facilitates travel of the chain around the arcuate portions of its path, as well as facilitates assembly and disassembly of the chain.

The outer links each include a main body or portion 61 having upper and lower or top and bottom surfaces 63 and 65, respectively. At each end, the outer links include fingers or projections or hook portions 67 which extend outwardly and downwardly from the bottom surface 65, i.e., in the direction of the cutter bar, and which include facing convex surfaces 69. The surfaces 69 are adapted to engage the surfaces 47 of the inner links and extend coninuously transversely the full width of the outer links and esemble one flank or driving surface of a gear tooth.

The fingers or projections 67 on the outer link have, in general, substantial depth in the direction of chain travel to afford, at each end, the provision of a longitudinally extending central cutout or recess 71 defined by laterally spaced longitudinally extending side portions 73.

The length or depth of the side portions 73 in the direction of chain travel affords provision of lower bearing surfaces 75 which engage the upper or top surfaces 23 of the inner links between the fingers 45 and which, particularly in the case of cutting links, are capable of bearing any load transmitted to the inner links from the cutting links toward the cutter bar.

Each recess 71 has a transverse width adapted to receive the stem 33 of the adjacent inner link so that the side portions 73 engage the sides of the stem 33 to prevent undesirable lateral movement between adjacent links. Each recess is also formed with an inner surface 77 of outwardly convex configuration to afford clearance for the stem during angular movement between adjacent inner and outer links.

The main body 61 of the outer links is dimensioned with a thickness between the top and bottom surfaces 63 and 65, in relation to the shape of the stem 33, such that when the bearing surfaces 75 of the side portions 73 are engaged with top surfaces 23 of the inner links, the lips 37 closely overlie the top surface 63 of the outer links, thereby preventing undesirable relative movement of adjacent links in directions away from the cutter bar.

To summarize, in part, relative movement of adjacent links in the lateral direction normal to the intended direction of chain travel is limited by means including the receipt of the stems 33 in the recesses 71, while relative movement of adjacent links in a direction at right angles to the lateral direction and normal to the direction of intended chain travel is limited by means including the receipt of the ends of the outer links between the top surface 23 of the inner links and the lips 37 on the stems. Transmission of the power which pulls the chain along its path of travel is provided by engagement of the transverse surfaces 49 and 69 which are generally of gear shape.

The outer cutting links 17 include cutting teeth 79 which can be either left or right handed and which project outwardly from the side margin of the upper surfaces 63. Any form of cutting tooth can be employed. Also, if desired, the connecting outer link 19 can be provided with a depth gauge portion in substitution for the depth gauge portion 39 on the inner depth gauge link 15.

Other alternatives are also possible. For instance, cutting teeth could be provided on the inner links, as for instance, as an extension of the stems on the inner links. In such cases, it is desirable to provide depth gauge portions on the outer connecting link immediately preceding such an inner cutting link. However, depth gauge inner links, such as the links 13 could be employed if only alternate inner links were cutter links.

In assembly, the finger 67 at one end of one of the outer links is initially inserted into the opening between the projection 45 and lip 37 on one end of an inner link when the outer and inner links are in relatively acute angular relation to each other. The links are then manipulated to straighten the angle therebetween by rotation of the links until the stem 33 enters into the adjacent recess 71 and until the lip 37 slips over the top surface 63 of the outer link main body as the bearing surface 75 approaches full engagement of the top surface 23 of the inner link. Such movement will engage the arcuate surfaces 49 and 69 with each other. Such connection of the links will also prevent unwanted movement perpendicular to the direction of travel of the chain as already explained. The above described manipulation is simply reversed to disconnect adjacent links.

Various of the features of the invention are set forth in the following claims.

What is claimed is:

1. A saw chain link comprising a main body elongated generally in the direction of intended movement, arcuate surfaces projecting from said main body in spaced convexly facing relation to each other and extending transversely the full width of the main body, and means defining respective recesses extending inwardly of said main body from each of the leading and trailing ends of said main body, said recesses extending in the direction of intended link movement and transversely to the curvature of said first arcuate surface.

2. A saw chain link comprising a main body elongated generally in the direction of intended movement, first arcuate surfaces projecting from said main body in spaced convexly facing relation to each other and extending transversely the full width of the main body, and means defining respective recesses extending inwardly of said main body from each of the leading and trailing ends of said main body, said recesses extending in the direction of intended link movement and transversely to the curvature of said first arcuate surfaces, said recesses being respectively defined, in part, by second transverse arcuate surfaces extending from adjacent to the outer margin of said first arcuate surfaces and in oppositely facing convex disposition.

3. A saw chain link comprising a main body elongated generally in the direction of intended movement, arcuate surfaces projecting from said main body in spaced convexly facing relation to each other and extending transversely for the full width of said main body, and means defining respective recesses extending inwardly of said main body from each of the leading and trailing ends of said main body, said recesses extending in the direction of intended link movement, and a cutting tooth projecting from said main body.

4. A saw chain link comprising a main body elongated generally in the direction of intended travel, arcuate surfaces extending transversely of the direction of intended travel for the full width of said main body and projecting from said main body in spaced convexly facing relation to each other, and a stem extending from said main body from between said arcuate surfaces in the same general direction as the projection of said surfaces and in a plane extending generally in the direction of intended travel.

5. A saw chain link comprising a main body elongated generally in the direction of intended travel, arcuate surfaces each extending transversely of the direction of intended travel for the full width of said main body and projecting from said main body in the same direction in spaced and convexly facing relation to each other, and a stem extending from said main body in the same general direction as the projection of said surfaces and in a plane extending generally in the direction of intended travel, said stem having at the leading and trailing margins thereof respective forwardly and rearwardly facing concave surfaces.

6. A saw chain link comprising a main body elongated generally in the direction of intended travel and having at the bottom thereof laterally spaced surfaces adapted for engaging a cutter bar, a stem extending from the top of said main body, said stem having at the leading and trailing margins thereof respective forwardly and rearwardly facing concave surfaces extending from adjacent to the top of said main body, and respective transversely extending arcuate surfaces each projecting from the top of said main body in the same direction and for the full width of said main body in spaced convexly facing relation to each other and in spaced relation from said concave surfaces of said stem.

7. A saw chain link comprising a main body elongated generally in the direction of intended travel, arcuate surfaces each extending transversely to the direction of intended travel for the full width of said main body and projecting from said main body in the same direction in spaced convexly facing relation to each other, a first tang projecting from said main body in the same general direction as the projection of said surfaces and in a plane extending generally in the direction of intended travel, and a second tang extending from said main body in a direction opposite to the projection of said first tang.

8. A saw chain link comprising a main body elongated generally in the direction of intended travel, arcuate surfaces each extending transversely to the direction of intended travel for the full width of said main body and projecting in the same direction from said main body in spaced convexly facing relation to each other, a depth gauge projecting from said main body and in a plane extending generally in the direction of intended travel, and a tang extending from said main body in a direction opposite to the projection of said depth gauge.

9. A saw chain link comprising a main body elongated generally in the direction of intended travel and having top and bottom faces, said bottom face providing bearing surfaces adapted to engage a cutter bar, hook portions at the ends of said main body including arcuate surfaces extending transversely to the direction of intended travel for the full width of said main body and projecting outwardly from said top surfaces of said main body in spaced convexly facing relation to each other, a portion projecting outwardly from said top surface of said main body in a plane extending generally in the direction of intended travel, said portion having at the leading and trailing margins thereof respective forwardly and rearwardly facing concave surfaces extending from adjacent said top surface of said main body, and a chain sprocket tang extending outwardly from said bottom surface of said main body in a plane extending generally in the direction of intended travel.

10. A saw chain comprising a series of detachably connected links, some of said links being cutter links, at least one adjacently located pair of said links having engageable load transmitting surfaces extending transversely of the direction of intended chain travel for the full width of said links, and having interengaging means limiting movement therebetween in a direction normal to both of said transverse direction and said direction of intended chain travel.

11. A saw chain comprising a series of detachably connected links, some of said links being cutter links, and at least one adjacently located pair of said links having engageable load transmitting surfaces extending transversely of the direction of intended chain travel for the full width of said links, and having interengaging means limiting movement therebetween in a direction transverse to the direction of intended chain travel.

12. A saw chain comprising a series of detachably connected links, some of said links being cutter links, at least one adjacently located pair of said links having engageable load transmitting surfaces extending transversely of the direction of intended chain travel for the full width of said links, and having interengaging means limiting movement therebetween in a direction transverse to the direction of intended chain travel, and having interengaging means limiting movement therebetween in a direction normal to both said transverse direction and said direction of intended chain travel.

13. A saw chain comprising detachably assembled links, some of said links including cutter links and including first and second links, said links each having opposing interengaging, convexly facing load transmitting surfaces extending transversely of the direction of intended chain travel, said first link having a recess extending from an end of said first link in the direction of intended chain travel, said second link having a stem extending outwardly of said second link between said load transmitting surfaces and received in said recess, whereby lateral movement between said links is limited.

14. A saw chain comprising detachably assembly first and second links, said links having interengaging, convexly facing load transmitting surfaces extending transversely of the direction of intended chain travel, said first link having a main body with an upper surface and a bearing surface spaced from said upper surface, said second link having a main body including an upper surface in opposing relation to said bearing surface, and having a stem extending outwardly from said second link upper surface and including a lip located in spaced relation to said second link upper surface and in opposing relation to and for engagement with said first link upper surface, thereby limiting movement between said links in a direction normal to said surfaces and to said direction of intended chain travel.

15. A saw chain comprising detachably assembled first and second links, said links having interengaging, convexly facing load transmitting surfaces extending transversely of the direction of intended chain travel, said first link having a main body with an upper surface and, at the end thereof, spaced side portions defining bearing surfaces spaced from said upper surface and defining a recess extending in the direction of intended chain travel, said second link having a main body including an upper surface in opposing relation to said bearing surfaces and including a stem extending outwardly from said second link upper surface and received in said recess, whereby transverse movement between said links is limited, said stem including a lip located in spaced relation to said second link upper surface and in opposing relation to said first link upper surface, thereby limiting movement between said links in a direction normal to said transverse direction and said direction of intended chain travel.

References Cited

UNITED STATES PATENTS

| | | | |
|---|---|---|---|
| 709,149 | 9/1902 | Grandjean et al. | 74—249 |
| 1,271,239 | 7/1918 | Sullivan | 74—252 |
| 2,017,457 | 10/1935 | Hamilton | 74—249 X |
| 2,387,064 | 10/1945 | Forrest | 143—135 |
| 2,246,225 | 6/1941 | Van Etten. | |
| 3,123,411 | 3/1964 | Ellison | 74—249 X |

DONALD R. SCHRAN, Primary Examiner

U.S. Cl. X.R.

74—249